Figure 1:
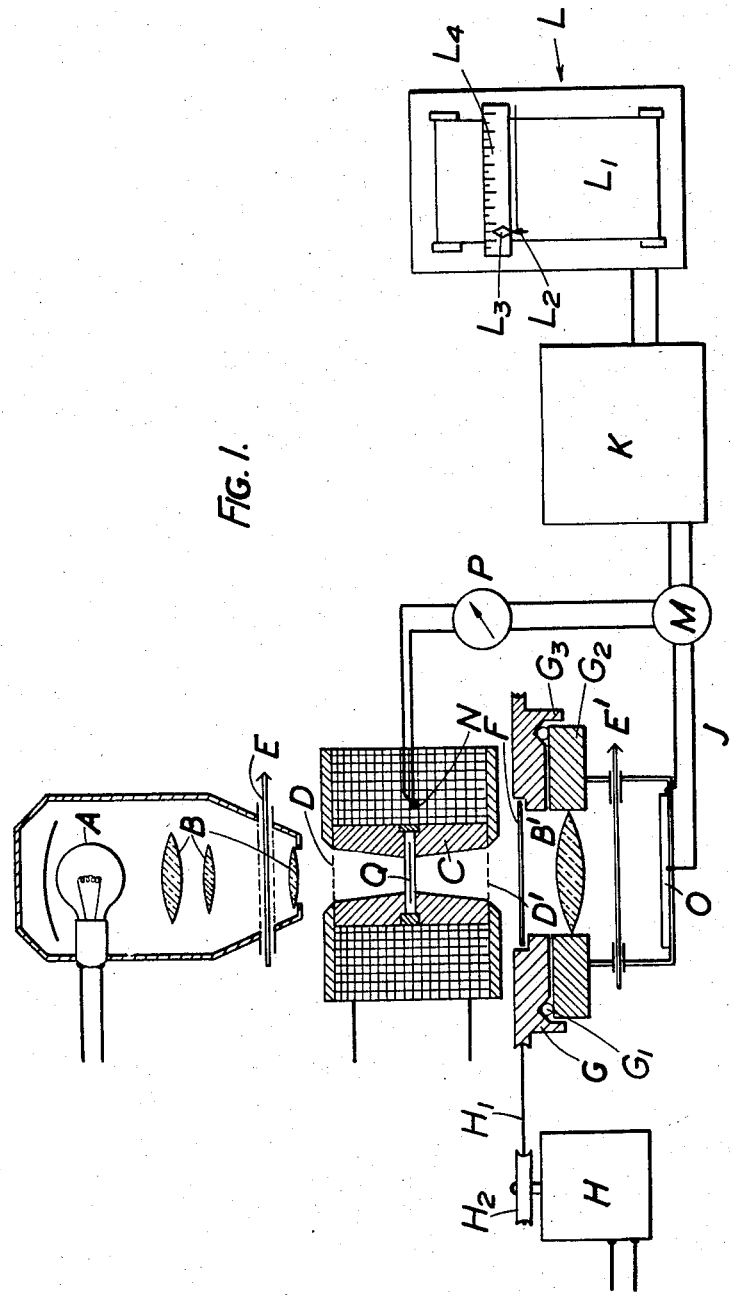

March 17, 1959  K. A. FISCHER  2,877,683
METHOD OF AND APPARATUS FOR MEASURING OPTICAL
PROPERTIES OF SUBSTANCES
Filed April 30, 1956  3 Sheets-Sheet 1

INVENTOR
Carl A. Fischer
BY
ATTORNEYS

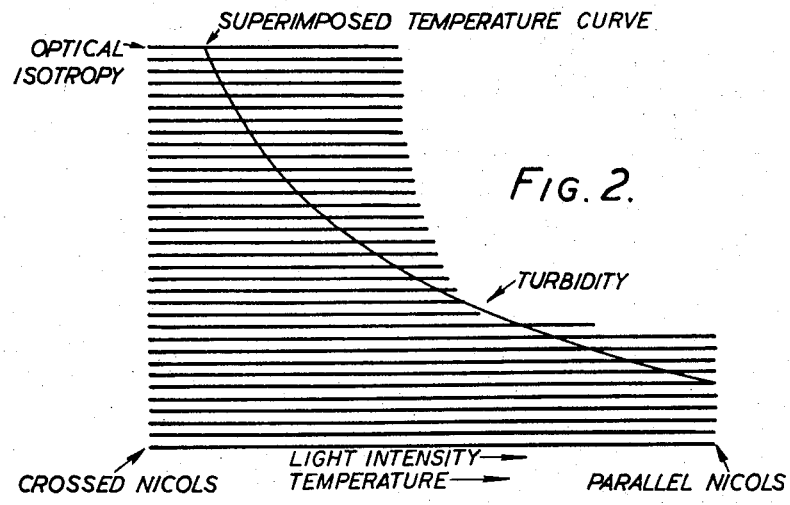
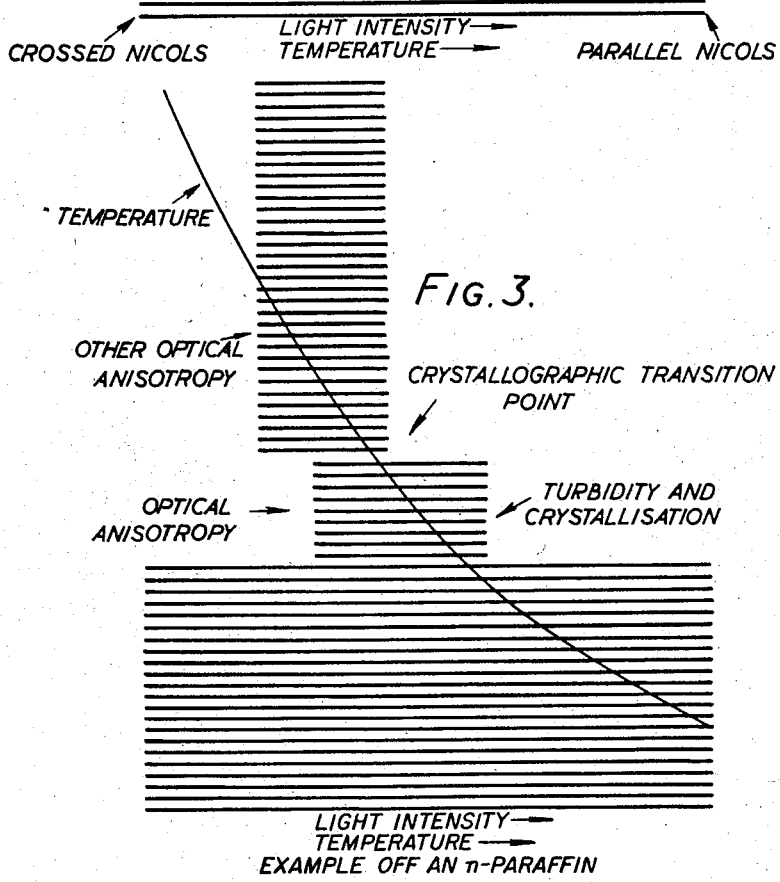

United States Patent Office 2,877,683
Patented Mar. 17, 1959

2,877,683

METHOD OF AND APPARATUS FOR MEASURING OPTICAL PROPERTIES OF SUBSTANCES

Karl A. Fischer, Hamburg-Blankenese, Germany, assignor to Deutsche Erdöl-Aktiengesellschaft, Hamburg, Germany Application April 30, 1956, Serial No. 581,627

Claims priority, application Germany April 30, 1955

1 Claim. (Cl. 88—14)

This invention relates to a method of and apparatus for measuring optical properties of substances.

The concentration or purity of chemical substances is frequently determined by measuring their physical properties, such as refractive index, density, melting point or the like. Thus, by measuring the magnitudes of optical properties such as turbidity, optical activity or optical anisotropy, the concentration or purity of a single substance or mixture of substances can be determined. Hitherto, measurements of the magnitudes of such optical properties have been measured singly and in succession, and these measurements are troublesome and take time.

An object of this invention is to provide a method for measuring a plurality of optical properties of a substance simultaneously and continuously over a wide temperature range.

This invention provides a method of determining a plurality of optical data of a substance wherein the said substance is placed in a chamber which is capable of being heated and which is located between a polariser and analyser and a beam of light is passed through the polariser chamber and analyser while the substance is cooling, either the polariser or analyser is maintained in periodic controlled movement, the emergent beam of light illuminates a photo-cell, and variations in the output from the photo-cell are recorded.

The invention also provides apparatus for carrying out the method which comprises a chamber, heating means for heating a substance placed within the chamber, a polariser and analyser located one on each side of the chamber, a light source arranged to provide a beam of light passing in succession through the polariser, the chamber and the analyser, a photo-sensitive device located in the path of the emergent beam of light, means for imparting a periodic movement to one of the polarising members and recording means for recording variations in the output of the photo-sensitive device.

The substance is introduced into a transparent chamber capable of being heated and located between the polariser and analyser of a polarisation apparatus. The substance is melted to a clear condition and the changes in state which take place during cooling, for example, changes in turbidity, crystallisation or phase conversion, are transmitted to a photocell with the aid of a polarised beam, of which the planes of vibration are periodically changed in their relative positions with respect to a second polarisation device, and the changes are transmitted from the photocell to a recording device.

Since one of the polarising members, i. e. either the analyser or the polariser, is maintained in periodic motion, the intensity beam of the beam of light emergent from the analyser and falling on the photo-sensitive device gradually decreases as the cross position of the polarising members is approached and then increases as the parallel position is approached. The periodic variations in the intensity of the emergent beam produce periodic variations in the photo-sensitive device and these variations are recorded by the recording device.

The periodic movement applied to one of the polarising members may be a continuous rotary movement or an alternate clockwise and anti-clockwise movement through 90°.

Figure 4:
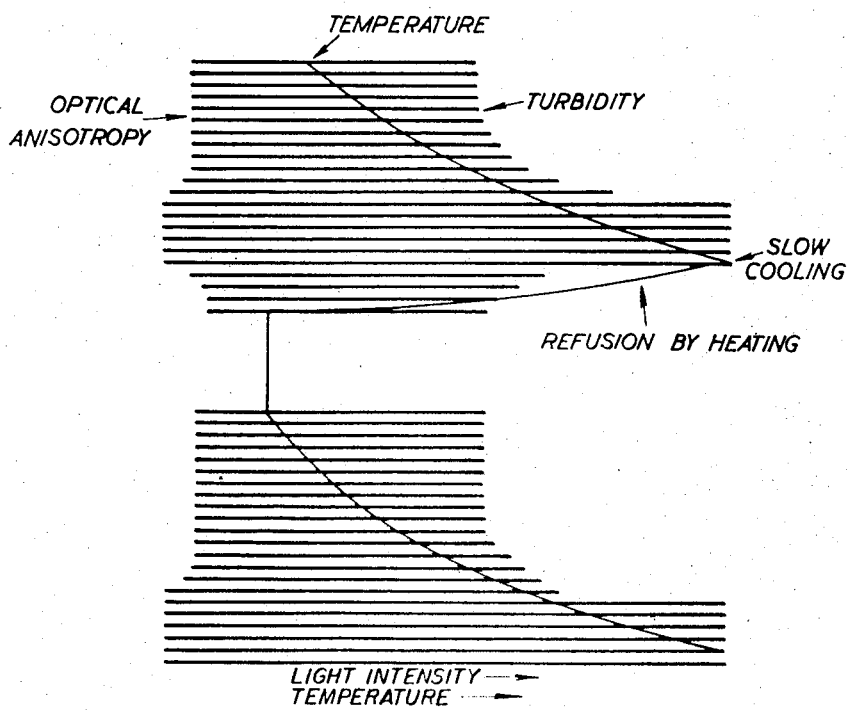

A form of apparatus constructed in accordance with the invention will now be described by way of example in greater detail with reference to the accompanying drawings in which Figure 1 is a somewhat diagrammatic general view of the apparatus, Figure 2 is a diagram of a record obtained during the investigation of a substance, Figure 3 is a record obtained during the investigation of another substance, Figure 4 is a record obtained during the investigation of a further substance.

Referring to Figure 1 the apparatus consists essentially of a light source A the strength of which remains accurately constant, a lens system B, a polariser E, a transparent chamber C capable of being heated, an analyser F, a photocell O and a line recording instrument L.

By means of the lens system B and the polariser E is focused a polarised beam of light from the light source A on to a substance Q to be investigated. After passing through the substance Q the light beam passes through the analyser F and a further lens B' on to the photocell O which actuates a recording instrument L.

Any source of light may be used to produce the light beam but it is essential that its intensity should remain as constant as possible. The light beam is focussed by the lens system B.

For the polariser E and analyser F there may be used polarisation foils, Nicol prisms or the like. Either the analyser F or the polariser E is given a periodic motion, the other polarising member being kept stationary. In the apparatus shown in the drawing the analyser F is given the periodic motion and is mounted in a housing G which runs on a ball race $G_1$ which is supported by a bearing ring $G_2$. The housing G is located radially by a dependent annular flange $G_3$ which surrounds the upper part of the bearing ring $G_2$ and is provided with a circumferential depression around which there runs an endless belt $H_1$ which also runs on a pulley $H_2$ driven by a motor H, the speed of which can be regulated. Thus the analyser F is rotated continuously.

It is immaterial, however, whether the polariser E is kept stationary and the analyser F rotated or vice versa. Thus, if desired, the analyser F can be fixed and the polariser E can be held in a rotatably mounted housing (which may be exactly similar to the housing G) and rotated by a motor (as the frame G is rotated by the motor H).

The metal chamber C which is capable of being heated, and is advantageously cylindrical, has an axial bore in which the predetermined thickness of the product Q to be invertigated is contained, for example, in a so-called micro-chamber or on the counting surface of the chamber of a device for counting blood corpuscles. The axial bore is closed at both ends by transparent optically isotropic plates D and D' of glass, quartz or the like.

The photocell O may be, for example, a photo-voltaic cell or an alkali cell. The electrodes I of the photocell O are connected to a line recording instrument L preferably through an amplifier K. The amplifier K may be a photoelectric amplifier, an electronic amplifier or an amplifier using transistors. The line recording instrument L may be replaced by a dot scriber which produces a succession of dots instead of a line, provided that the spaces between adjacent dots are sufficiently small. In this case it is often possible to dispense with the use of an amplifier, but nevertheless a line recording instrument which produces an uninterrupted line is preferable. When it is desired to determine the temperature changes in the transparent chamber C in addition to the optical data, the output of the photocell O is disconnected from the line recording instrument at regular short intervals, for example, after 1, 2, 5 or 10 revolutions of the analyser F by a switch device M, and the line recording instrument L is connected to a thermometer N which is inserted in the chamber C and which may be, for example, a resistance thermometer or a thermocouple.

The line recording instrument L includes a slowly moving length of paper $L_1$ on which a trace is recorded by a pen $L_2$ which is secured to a pointer $L_3$. The pointer $L_3$ moves over a scale $L_4$, which extends laterally with respect to the paper $L_1$, in accordance with variations in the output of the amplifier K. Referring to Fig. 1, the pointer $L_3$ moves to the right as the output of the amplifier K increases. The pen $L_2$ is lifted from the paper periodically so that the record produced consists of a number of almost parallel lines as shown in Figures 2, 3 and 4. A resistance potentiometer P or a countervoltage is used to ensure that the highest temperature to be recorded falls at the desired position on the record produced by the instrument. Thus the temperature at which the optical measurements are made is recorded from time to time while the optical measurements are being made.

Colour filters, filters transparent to infra-red or ultra-violet rays, diaphragms or the like, may be arranged in the path of the light before or after it passes through the substance.

The simultaneous determination of a plurality of optical data and the temperature of the substance Q under investigation is carried out in the following way: The substance Q is heated in the chamber C until it is clearly transparent. Rays from the light source A are passed through the chamber C and the rotation of the analyser F causes a periodic variation in the output of the photocell O and consequently the amplifier K. Thus the line recording instrument L produces a succession of lines on the paper. The lines are approximately straight and parallel to one another because of the relatively slow movement of the paper $L_1$ in relation to the rate of rotation of the analyser F. The intensity of the light is advantageously so controlled that, in the absence of absorption by the substance Q, the lines traced by the pen $L_2$ extend over substantially the whole width of the paper $L_1$. The chamber C is then allowed to cool slowly and a stage is reached when the substance Q solidifies and becomes turbid so that it absorbs some of the light. This reduces the intensity of the light which falls on the photocell O when the polarising members E and F are in the parallel position, but does not prevent complete extinction of the light when the polarising members E and F are in the crossed position. Thus the line traces which measure the variation in output of the amplifier K (and consequently the variations in output of the photocell O) no longer extend to the previous maximum throw, but continue to return to the minimum position, which corresponds to complete extinction of the light. This effect is shown in Fig. 2 where the left hand limit of the parallel lines indicates the minimum intensity of the emergent light and the right hand limit of the lines indicates the maximum intensity of the emergent light. Similarly, the temperature curve indicates increasing temperature to the right and decreasing temperature to the left. The paper $L_1$ moves downwards and thus successive traces are formed above the preceding traces. It will be seen that the temperature was initially high and that the lines traced by the pen $L_2$ then extended across to the maximum extent. As the temperature is reduced however, the right hand limit of the lines moves to the left (indicating a decrease in the maximum intensity of the emergent light when the polarising members E and F are in the parallel position) whereas the left hand limit of the lines remains in the same position indicating that the minimum intensity of the light (which occurs when the polarising members E and F are in the crossed position) remains unchanged.

If the component of the substance Q which separates out on cooling becomes optically anisotropic, complete extinction of the light when the polarising members E and F are in the crossed position no longer occurs and therefore the lines traced by the pen $L_2$ no longer return to the original zero position corresponding to zero output from the photocell O. This is shown in Fig. 3 in which it can be seen that the substance Q becomes both turbid and optically anisotropic at the same temperature. The turbidity is revealed by the fact that the right hand limit of the lines moves to the left for the reasons already explained with reference to Fig. 2 and the presence of optical anisotropy is revealed by the fact that the left hand limit of the lines moves to the right, for this indicates that the light beam is no longer completely extinguished when the polarising members E and F are in the crossed position. As the temperature increases, however, the degree of turbidity and the degree of optical anisotropy both change so that both the right hand and left hand limits of the lines again change.

The position of the lefthand limits of the lines also gives a measure of optical activity if the substance Q is optically active, but, in order to observe this and to separate it from the phase displacement of the traces produced by optical anisotropy, it is necessary to observe the formation of the line traces in relation to the rotation of the analyser F. This may be facilitated by means of dots provided on the housing G of the analyser F which indicate when the polariser and analyser are in the crossed position. For observations of optical activity it is advisable to work with monochromatic or approximately monochromatic light. For general purposes, however, unfiltered or slightly filtered light from an incandescent lamp suffices.

Thus many products, for example, artificial resins of varying degrees of polarisation, paraffins, waxes, oil-containing slack waxes, resins, organic compounds or the like can be characterised to a considerable extent as is shown in Figure 3.

Even when the product covers only an area of a few square millimetres and has a thickness of, for example, $\frac{1}{10}$ millimetre the irregular arrangement of the particles causing turbidity or optical anisotropy leads to statistically mean values of the effects under observation which are often reproducible with great accuracy. This can be seen from Fig. 4 which records the results obtained when a substance Q was first cooled until it became turbid, then re-fused by heating, and then again allowed to cool. It will be seen that the results obtained during the two successive cooling operations agree closely with one another.

In this manner true or apparent melting points or softening points can be accurately detected and changes, if desired, over a wide temperature range, can be followed continuously.

By mounting the polariser E so that it can be removed and inserting an analogous polariser E' below the product, the product is then located not between the polariser and analyser, but above the polarisation assembly. The product is then irradiated only by a normal light beam, not by a polarised light beam, and merely causes a change in the intensity of the light when turbidity begins, without brightening occurring with the members of the polarisation arrangement in the crossed position when optically anisotropic crystal forms occur, or without phase displacement occurring in the case of optical activity. In this manner it is possible to measure turbidity alone without measuring the optical anisotropic or optical activity.

I claim:

Apparatus for determining a plurality of optical data of a substance, which comprises a chamber, heating means for heating a substance placed within the chamber, temperature-measuring means for measuring the temperature of the interior of the chamber, a polariser and analyser situated one on each side of the chamber, a light source arranged to provide a beam of light passing in succession through the polariser, the chamber and the analyser, a photo-sensitive device located in the path of the emergent light beam, means for imparting a continuous periodic rotary movement about the axis of the light beam to one of the polarising members, recording means for recording variations in the output of the photo-sensitive device, and switch means operable to disconnect the recording means from the photo-sensitive device and to connect it to the temperature-measuring means to record the said temperature.

References Cited in the file of this patent

UNITED STATES PATENTS

| | | |
|---|---|---|
| 1,609,129 | Roberts | Nov. 30, 1926 |
| 2,244,362 | Hartig | June 3, 1941 |
| 2,440,472 | Horner et al. | Apr. 27, 1948 |
| 2,450,761 | MacNeille | Oct. 5, 1948 |
| 2,455,116 | Gittus | Nov. 30, 1948 |
| 2,668,470 | Fischer | Feb. 9, 1954 |